United States Patent
Choi

(10) Patent No.: US 9,428,066 B2
(45) Date of Patent: Aug. 30, 2016

(54) PORTABLE CHARGER AND METHOD OF OPERATING THE SAME

(71) Applicant: LSIS CO., LTD., Anyang-si, Gyeonggi-do (KR)

(72) Inventor: Seung Woo Choi, Suwon-si (KR)

(73) Assignee: LSIS CO., LTD., Anyang-Si (KR)

(*) Notice: Subject to any disclaimer, the term of this patent is extended or adjusted under 35 U.S.C. 154(b) by 607 days.

(21) Appl. No.: 13/919,846

(22) Filed: Jun. 17, 2013

(65) Prior Publication Data

US 2014/0002009 A1 Jan. 2, 2014

(30) Foreign Application Priority Data

Jun. 28, 2012 (KR) .................. 10-2012-0070289

(51) Int. Cl.
*H02J 7/00* (2006.01)
*B60L 11/18* (2006.01)

(52) U.S. Cl.
CPC ........... *B60L 11/1809* (2013.01); *H02J 7/0004* (2013.01); *H02J 7/0026* (2013.01); *H02J 7/0036* (2013.01); *H02J 7/0052* (2013.01); *B60L 11/1816* (2013.01); *B60L 11/1838* (2013.01); *B60L 11/1848* (2013.01); *B60L 2230/10* (2013.01); *H02J 7/0042* (2013.01); *Y02T 10/7005* (2013.01); *Y02T 10/7055* (2013.01); *Y02T 10/7088* (2013.01);
(Continued)

(58) Field of Classification Search
USPC .......................................... 320/107, 109, 137
See application file for complete search history.

(56) References Cited

U.S. PATENT DOCUMENTS

2011/0169447 A1* 7/2011 Brown ................. B60L 3/0069
320/109
2011/0181104 A1* 7/2011 Kamaga ................ B60K 6/445
307/9.1

(Continued)

FOREIGN PATENT DOCUMENTS

CN 102195224 9/2011
CN 102341990 2/2012

(Continued)

OTHER PUBLICATIONS

Korean Intellectual Property Office Application Serial No. 10-2012-0070289, Notice of Allowance dated Sep. 16, 2014, 2 pages.

(Continued)

*Primary Examiner* — Nathaniel Pelton
(74) *Attorney, Agent, or Firm* — Lee Hong Degerman Kang & Waimey; Jonathan Kang; Jeffrey Lotspeich

(57) ABSTRACT

Disclosed are a portable charger and a method of operating the same. The portable charger includes a main body; a first connector connected to the main body and a commercial power source; and a second connector connected to the main body and an external apparatus, wherein the main body comprises: a power line formed between the first and second connectors to allow a commercial electric power to flow through the power line; a relay disposed on the power line to intermit the commercial electric power flowing through the power line; a data communication unit connected to the power line to perform data communication with the external apparatus connected to the second connector through the power line; and a switch disposed between the power line and the data communication unit to intermit the connection between the data communication unit and the power line.

9 Claims, 5 Drawing Sheets

(52) U.S. Cl.
CPC ............ *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 30/14* (2013.01)

(56) References Cited

U.S. PATENT DOCUMENTS

| | | | | |
|---|---|---|---|---|
| 2011/0199048 | A1* | 8/2011 | Yokoyama | H02J 7/045 320/109 |
| 2011/0291612 | A1* | 12/2011 | Fujitake | B60K 6/445 320/107 |
| 2012/0091957 | A1* | 4/2012 | Masuda | H01R 13/7035 320/109 |
| 2012/0092141 | A1* | 4/2012 | Ichihara | H04B 3/54 340/12.32 |
| 2012/0133326 | A1* | 5/2012 | Ichikawa | B60L 11/14 320/109 |
| 2013/0063075 | A1* | 3/2013 | Miller | C12R 1/225 320/107 |

FOREIGN PATENT DOCUMENTS

| | | |
|---|---|---|
| EP | 2385591 | 11/2011 |
| EP | 2405555 | 1/2012 |
| JP | 2009-131059 | 6/2009 |
| JP | 2011-083156 | 4/2011 |
| JP | 2011-172327 | 9/2011 |
| JP | 2012-085457 | 4/2012 |
| KR | 20-1994-0013732 | 6/1994 |
| KR | 19980060400 | * 12/1996 |
| KR | 10-1998-0060400 | 10/1998 |
| KR | 10-2008-0058689 | 6/2008 |
| WO | 2011/138581 | 11/2011 |

OTHER PUBLICATIONS

Japan Patent Office Application Serial No. 2013-135173, Office Action dated May 28, 2014, 3 pages.
Korean Intellectual Property Office Application Serial No. 10-2012-0070289, Office Action dated Oct. 29, 2013, 6 pages.
European Patent Office Application Serial No. 13172971.7, Search Report dated Sep. 24, 2013, 9 pages.
The State Intellectual Property Office of the People's Republic of China Application Serial No. 201310268972.4, Office Action dated Feb. 28, 2015, 7 pages.

* cited by examiner

# PORTABLE CHARGER AND METHOD OF OPERATING THE SAME

CROSS-REFERENCE TO RELATED APPLICATIONS

Pursuant to 35 U.S.C. §119(a), this application claims the benefit of earlier filing date and right of priority to Korean Patent Application No. 10-2012-0070289, filed on Jun. 28, 2012, the contents of which is incorporated by reference herein in its entirety.

BACKGROUND

The embodiment relates to a portable charger, which can be selectively operated in a plurality of modes and a method of operating the same.

An electric vehicle refers to a vehicle driven by using electric energy and may be classified into a battery powered electric vehicle and a hybrid electric vehicle.

The battery powered electric vehicle, which is generally called an electric vehicle, is driven by using only electric energy. The hybrid electric vehicle is driven by using electricity and fossil fuels. Such an electric vehicle includes a battery. Specifically, in a case of an plug-in type hybrid electric vehicle in the battery powered electric vehicle and the hybrid electric vehicle, the battery is charged with a current supplied from an external electric power source to drive an electric motor.

FIG. 1 is a view showing a portable charger according to the related art.

As shown in FIG. 1, the charger is equipped with a cord set.

Referring to FIG. 1, the portable charger 10 includes a main body 11, a first connector 12 connected to the main body 11 and a commercial power source, and a second connector 13 connected to the main body 11 and an electric vehicle.

According, to the portable charger 10, when the first connector 12 is connected to the commercial power source and the second connector 13 is connected to the electric vehicle, the electric power supplied from the commercial power source is transferred to a battery installed in the electric vehicle through the portable charger 10.

The portable charger 10 serves as a power supply cable for simply supplying an electric power to the electric vehicle connected thereto.

A separated communication port 14 must be provided in the portable charger 10 in order to communicate with an external apparatus (for example, an electric vehicle or a diagnosis apparatus) through the portable charger 10.

However, the properties of perfect water proof and disassembly are required to the above-described portable charger due to its using environment. When the communication port 14 is formed at an outside of the main body 11, an additional process (such as an O-ring or a bushing) for achieving the waterproof performance of the main body 11 is required, so that an additional cost is caused.

Further, as described above, if the communication port 14 is formed, since it is impossible to prevent an access of a malicious user, an additional locking mechanism or a special customized communication cable for preventing the malicious access is required.

SUMMARY

The embodiment provides a portable charger having a communication function for a diagnosis, a charging history inquiry, a firmware update.

The embodiment provides a portable charger capable of providing one of a plurality of functions according to a connection state of an electric vehicle.

In addition, the embodiment provides a portable charger which performs one of a vehicle charging function, a charging history inquiry function, a firmware update function and a diagnosis function according to a connection state of an electric vehicle or an instruction input from a diagnostic device or the electric vehicle, and a method of operating the same.

Meanwhile, the embodiments are not limited to the above object, and those skilled in the art can clearly understand other objects from following description.

The embodiment provides a portable charger including a main body; a first connector connected to the main body and a commercial power source; and a second connector connected to the main body and an external apparatus, wherein the main body comprises: a power line formed between the first and second connectors to allow a commercial electric power to flow through the power line; a relay disposed on the power line to intermit the commercial electric power flowing through the power line; a data communication unit connected to the power line to perform data communication with the external apparatus connected to the second connector through the power line; and a switch disposed between the power line and the data communication unit to intermit the connection between the data communication unit and the power line.

The power line performs one of a charging function for supplying the commercial electric power and a communication function for supplying data according to switching states of the relay and the switch.

The portable charger further includes a charger control unit for controlling switching operations of the relay and the switch, wherein the charger control unit controls the switching operations of the relay and the switch according to a variation of a pilot signal which is transceived between the external apparatus and the second connector.

The charger control unit allows the relay to be turned off and the switch to be turned on when a level of the pilot signal is maintained at a first level after the external apparatus is connected to the second connector, and the charger control unit allows the relay to be turned on and the switch to be turned off when the level of the pilot signal is dropped down to a second level lower than the first level after the external apparatus is connected to the second connector.

A plurality of selection buttons for selecting an operation function of the portable charger are formed on the main body, and the charger control unit controls the switching operations of the relay and the switch according to a button selection by a user.

The relay and the switch are turned on or off according to a switching signal input from the external apparatus connected to the second connector.

The power line includes a first power line through which a positive first electric power flows; and a second power line through which a negative second electric power flows. The relay includes a first relay intermitting the first electric power which flows through the first power line; and a second relay intermitting the second electric power which flows through the second power line. And, the data communication unit includes a first data communication unit performing data communication through the first power line; and a second data communication unit performing data communication through the second power line.

One of the first and second data communication units is a data reception unit for receiving data transmitted from the external apparatus connected to the second connector, and remaining one is a data transmission unit for transmitting internal data to the external apparatus.

Each of the first and second data communication units comprises a photo coupler including a light emitting diode emitting light and a light receiving transistor receiving the light generated from the light emitting diode.

The switch includes a first switch intermitting a connection between the first power line and the first data communication unit; a second switch intermitting a connection between the second power line and the second data communication unit; and a third switch intermitting a driving electric power supplied to the second data communication unit.

The data include at least one of a firmware, charging history information and diagnosis information of the portable charger.

Meanwhile, the embodiment provides a method of operating a portable charger which supplies an electric power for charging an external apparatus from a commercial power source to the external apparatus. The method includes connecting the portable charger to the external apparatus; identifying a pilot signal transceived between the portable charger and the external apparatus; supplying a commercial electric power to the external apparatus when the pilot signal has a first level; and performing data communication with the external apparatus when the pilot signal has a second level.

The supplying of the commercial electric power comprises using a power line formed between an input terminal and an output terminal of the commercial power source in the portable charger as a line for supplying the commercial electric power, and the performing of the data communication comprises using the power line as a data communication line.

The method further includes receiving an instruction transmitted from the external apparatus, and the power line is used for supplying at least one of the commercial electric power and data according to the instruction.

The method further includes receiving a button selection from one of a plurality of selection buttons formed on the portable charger, and the power line is used for supplying one of the commercial electric power and data according to the received button selection.

The performing of the data communication includes performing at least one of a reception of a firmware for updating the firmware of the portable charger, a transmission of charging history information of the portable charger and a transmission of charger diagnosis information of the portable charger.

According to the embodiment, since any communication ports for the firmware update function, the charging history inquiry function and the charger diagnosis function are absent at an outer portion of the portable charger, an additional cost for fabricating a communication port is not necessary, so that a seal structure of the portable charger can be implemented at a lower cost.

According to the embodiment, since a port for implementing a communication function is not observed from the outer appearance of the portable charger, a malicious access due to a misuse by an arbitrary user can be prevented.

In addition, according to the embodiment, the communication function can be implemented by using the portable charger, so that the communication function can be implemented at a lower cost as compared with the related art such as an RF scheme.

DETAILED DESCRIPTION OF THE EMBODIMENTS

The principle of the embodiments will be described below. Therefore, although not specifically described and depicted in the specification, a person having the ordinary skill in the art may realize the principle of the embodiments and may invent various apparatuses within the concept and scope of the embodiments. Further, in principle, conditional terms and embodiments mentioned in the specification shall be obviously intended to understand the concept of the embodiments and may not limit the scope of the embodiments.

Further it shall be understood that all detailed descriptions, which teach a specific embodiment as well as a principle, an aspect and embodiments, are intended to include structural and functional equivalents. Further, it should be understood that the equivalents may include equivalents to be developed in the future as well as known equivalents and may include all devices invented for performing the same functions regardless of the structure thereof.

Figure 1:
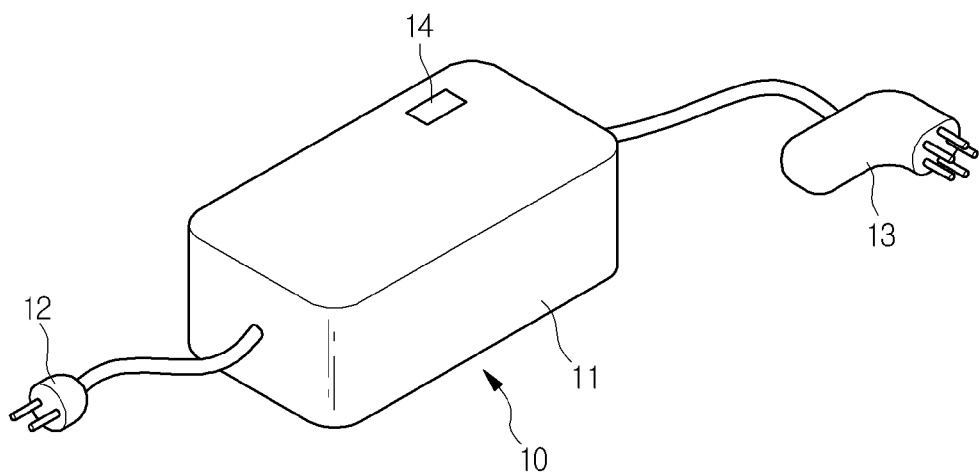
FIG. 1 is a view showing a portable charger according to the related art.
Figure 2:
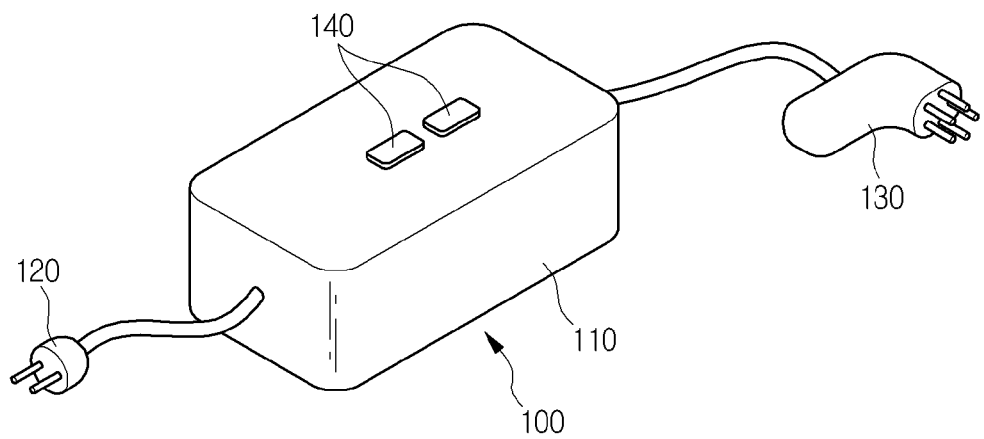
FIG. 2 is a view showing an appearance of a portable charger according to an embodiment.
Figure 3:
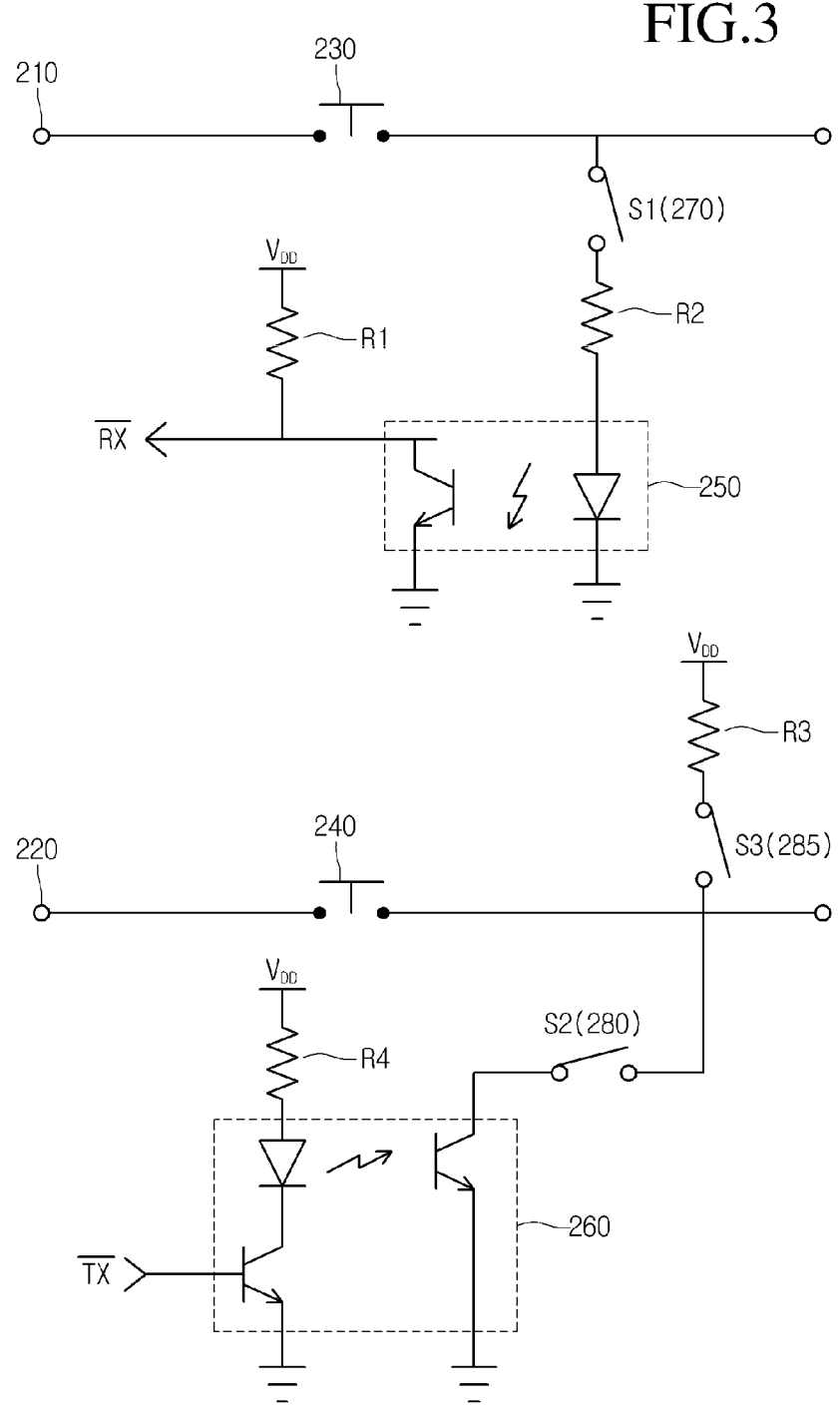
FIGS. 3 and 4 are internal circuit diagrams showing a portable charger according to an embodiment.

FIG. 2 is a view showing an appearance of a portable charger according to an embodiment. FIG. 3 is an inner circuit diagram of a portable charger according to an embodiment.

Referring to FIGS. 2 and 3, the portable charger 100 according to an embodiment is equipped with a cord set.

The portable charger 100 includes a main body 110, a first connector 120 connected to the main body 110 and a commercial power source, and a second connector 130 connected to the main body 110 and an electric vehicle.

Each of the first and second connectors 120 and 130 may include three lines. One line is a positive power line for supplying an electric power having a positive property. Another line is a negative power line for supplying an electric power having a negative property. The other line is a communication line. Further, each of the first and second connectors 120 and 130 may further include a ground line connected to a ground.

The communication line is a line for transmitting and receiving a pilot signal.

A circuit for operating and controlling the portable charger 100 is included in the main body 110.

Meanwhile, a plurality of selection buttons 140 for setting an operation function of the portable charger 100 may be formed on the main body 110.

The plurality of selection buttons 140 for selecting whether the portable charger 100 is used as a charging function or a communication function is formed on the main body 110.

That is, one of the selection buttons 140 is a button for using the portable charger 100 as the charging function and the other is a button for using the portable charger 100 as the communication function.

The communication function may include a firmware update function, a charging history inquiry function and a charger diagnosis function.

That is, when the charging function is selected through the selection buttons 140, the portable charger 100 supplies an electric power to a battery of the electric vehicle through the first and second connectors 120 and 130.

In other words, when the charging function is selected after the first connector 120 is connected to a commercial power source and the second connector 130 is connected to the electric vehicle (practically, a plug provided on the electric vehicle), the portable charger 100 supplies the commercial electric power input through the first connector 120 to the battery of the electric vehicle connected to the second connector 130.

To the contrary, when the communication function is selected through the selection buttons 140, the portable charger 100 performs the communication function with an external apparatus connected to the second connector 130.

For example, the external apparatus may be an electric vehicle, otherwise, may be a diagnosis apparatus for diagnosing the portable charger 100.

Although two selection buttons 140 are described above, this serves just as an embodiment. Thus, five buttons 140 may be equipped for selecting the firmware update function, the charging history inquiry function and the charger diagnosis function in the communication function, respectively.

Hereinafter, the internal circuit of the portable charger 100 will be described in more detail.

Figure 4:
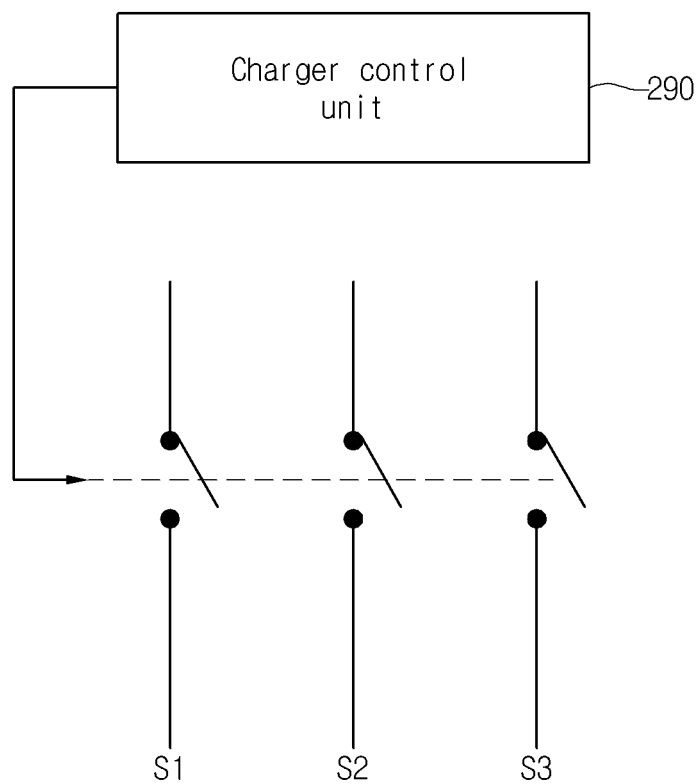

Referring to FIGS. 3 and 4, an inner configuration circuit 200 of the portable charger 100 includes a first power line 210, a second power line 220, a first relay 230 for intermitting a power supply through the first power line 210, a second relay 240 for intermitting a power supply through the second power line 220, a data reception unit 250 connected to the first power line 210 to receive data transferred through the first power line 210, a data transmission unit 260 connected to the second power line 220 to transmit internal data through the second power line 220 to an external apparatus (for example, an electric vehicle or a diagnosis apparatus), a first switch S1(270) for determining whether the data reception unit 260 is operated, and second and third switches S2(280) and S3(285) for determining whether the data transmission unit 270 is operated.

Referring to FIG. 4, the portable charger 100 further includes a charger control unit 290.

Hereinafter, the operation of the internal circuit of the portable charger 100 will be described with reference to FIGS. 3 and 4.

The charger control unit 290 controls switching operations of the first to third switches 270 to 285, such that electric powers are supplied or data are transmitted through the first and second power lines 210 and 220.

That is the charger control unit 290 senses whether an external apparatus is connected to the second connector 130.

The connection sensing of an external apparatus may be performed based on whether a state of the second connector 130 is changed from a low state to a high state.

When the charger control unit 290 senses that an external apparatus is connected to the second connector 130, the charger control unit 290 identifies the pilot signal transferred through a pilot signal line.

Generally, the pilot signal is maintained at 12V. When an electric vehicle is connected to the second connector 130 and the electric vehicle completes a charging preparation operation so that a charging request is generated, the voltage of the pilot signal drops down to 9V.

Thus, when the voltage of the pilot signal is changed from 12V to 9V, the charger control unit 290 recognizes that the connected external apparatus is an electric vehicle and thus, a charging request is generated from the connected electric vehicle, so that the charger control unit 290 allows an electric power to be supplied to a battery of the connected electric vehicle through the first and second power lines 210 and 220.

To this end, the charger control unit 290 allows the first and second power lines 210 and 220 to operate the charging function.

That is, the charger control unit 290 allows the first to third switches S1 to S3 to be switched off so that the first and second relays 230 and 240 are turned on.

Thus, the data reception unit and the data transmission unit 250 and 260 are inactivated.

Since the first and second relays 230 and 240 are turned on, the electric power input through the first connector 120 flows through the first and second power lines 210 and 220, so that the electric power is supplied to the battery of the electric vehicle through the second connector 130.

Meanwhile, when the voltage of the pilot signal is maintained at 12V even after sensing the connection of the external apparatus, the charger control unit 290 allows the first and second power lines 210 and 220 to perform the communication function.

That is, the charger control unit 290 allows the first to third switches S1 to S3 to be turned on and allows the first and second relays 230 and 240 to be turned off.

In this case, since the first and second relays 230 and 240 are turned off, the electric power transferred through the first and second power lines 210 and 220 is shut off.

Further, since the first to third switches S1 to S3 are switched on, the data reception unit 250 is connected to the first power line 210 and the data transmission unit 260 is connected to the second power line 220.

Thus, since the data reception unit 250 and the data transmission unit 260 are activated, the data reception unit 250 receives the data transferred through the first power line 210 and the data transmission unit 260 transmits the data generated from an internal through the second power line 220 to the external apparatus.

The first switch S1 is switched either on or off to allow the data reception unit 250 to be selectively connected to the first power line 210.

The second switch S2 is switched either on or off to allow the data transmission unit 260 to be selectively connected to the second power line 220.

The third switch S3 is switched either on or off to selectively supply the operation power to the data transmission unit 260.

That is, when the first to third switches S1 to S3 are switched on, the data reception unit 250 and the data transmission unit 260 may be activated, so that the communication function for transmitting/receiving data is performed.

Meanwhile, the data reception unit 250 and the data transmission unit 260 are connected to the first and second power lines 210 and 220 provided at rear ends of the first and second relays 230 and 240.

That is, when the portable charger performs the communication function, the first and second relays 230 and 240 are maintained in the turned-off state. In this case, if the data reception and transmission units 250 and 260 are formed at the front ends of the first and second relays 230 and 240, since the first and second power lines 210 and 220 are short-circuited by the first and second relays 230 and 240, as described above, the data reception and transmission units 250 and 260 are formed at the rear ends of the first and second relays 230 and 240.

Meanwhile, each of the data reception and transmission units 250 and 260 is an insulated communication device including a light emitting diode for emitting light and a light receiving diode for receiving light generated from the light emitting diode.

When the first power line 210 is connected to the data reception unit 250 and the second power line 220 is connected to the data transmission unit 250 so that the portable charger 100 performs the communication function, the first power line 210 is operated as a data reception line and the second power line 220 is operated as a data transmission line. However, the functions of the first and second power lines 210 and 220 may be interchanged.

The first power line 210 may be a positive power line for transferring an electric power having a positive property therethrough. The second power line 220 may be a negative power line for supplying an electric power having a negative priority. The opposite configuration to the above is possible, too.

Consequently, the first and second relays 230 and 240, and the first to third switches 270 to 285 included in the portable charger perform the switching operations as shown in the following table 1, so that the portable charger performs the charging or communication function.

TABLE 1

|  | Charging function | Communication function |
|---|---|---|
| First relay | On | Off |
| Second relay | On | Off |
| First switch | Off | On |
| Second switch | Off | On |
| Third switch | Off | On |

Figure 5:
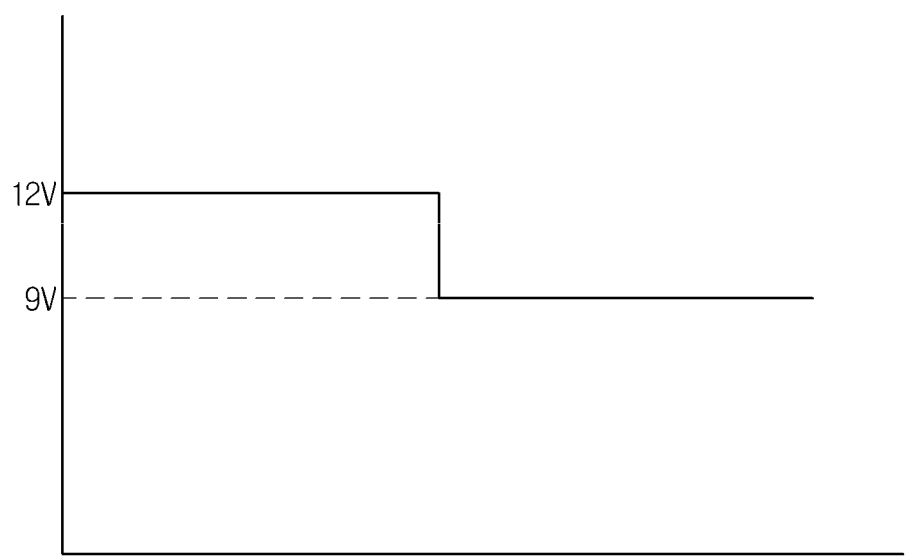
FIG. 5 is a graph illustrating a variation of a pilot signal according to an embodiment.

FIG. 5 is a graph illustrating a variation of a pilot signal according to an embodiment.

Referring to FIG. 5, the voltage of the pilot signal is usually maintained at 12V and the electric vehicle is connected to the second connector 130. The voltage of the pilot signal is changed from 12V to 9V when the charging request is generated from the electric vehicle.

Thus, when the voltage of the pilot signal is 12V, the charger control unit 190 allows the portable charger to perform the communication function. When the voltage of the pilot signal is 9V, the charger control unit 190 allows the portable charger to perform the charging function.

Figure 6:
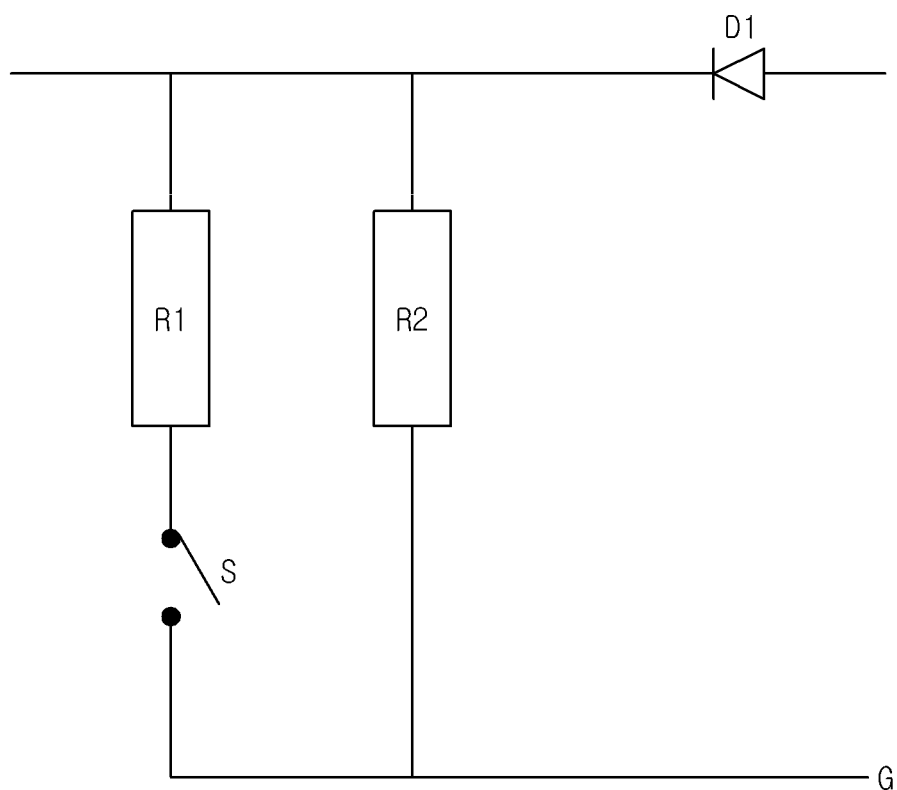
FIG. 6 is a view illustrating a pilot signal line of an external apparatus according to an embodiment.

FIG. 6 is a view showing a pilot signal line of an external apparatus according to an embodiment.

Referring to FIG. 6, the pilot signal line of the external apparatus, which is connected to the second connector 130 of the portable charger 100, includes a diode D1, a first resistor R1, a second resistor R2 and a switch S for intermitting the connection of the first resistor R1.

It is assumed that the external apparatus is an electric vehicle.

The switch S is usually maintained in a turned-off state.

Thus, the voltage of the pilot signal supplied through the pilot signal line is maintained at 12V.

In this case, if a charging start request is generated according to a user request after a charging operation of the electric vehicle is completed, the switch S is turned on.

As the switch S is turned on, the first resistor R1 is connected to the pilot signal line and the voltage of the pilot signal is dropped down to 9V due to the voltage division of the first resistor R1 connected thereto.

Thus, the charger control unit 290 configured in the portable charger 100 allows the portable charger 100 to perform either the communication function or the charging function according to the variation of the pilot signal.

Meanwhile, the charger control unit 290 may control an operation for the communication function or the charging function according to a section of the selection button 140 provided on the main body 110.

To the contrary, the operation of the portable charger 100 may be controlled by an external apparatus.

The external apparatus connected to the portable charger 100 outputs a control signal (for example, a control signal for a switch control) to the portable charger 100, such that the portable charger 100 performs the communication function or the charging function.

This may be implemented by an internal circuit of a diagnosis apparatus. Otherwise, it is possible to realize the above function through the control of an internal circuit of an electric vehicle.

Figure 7:
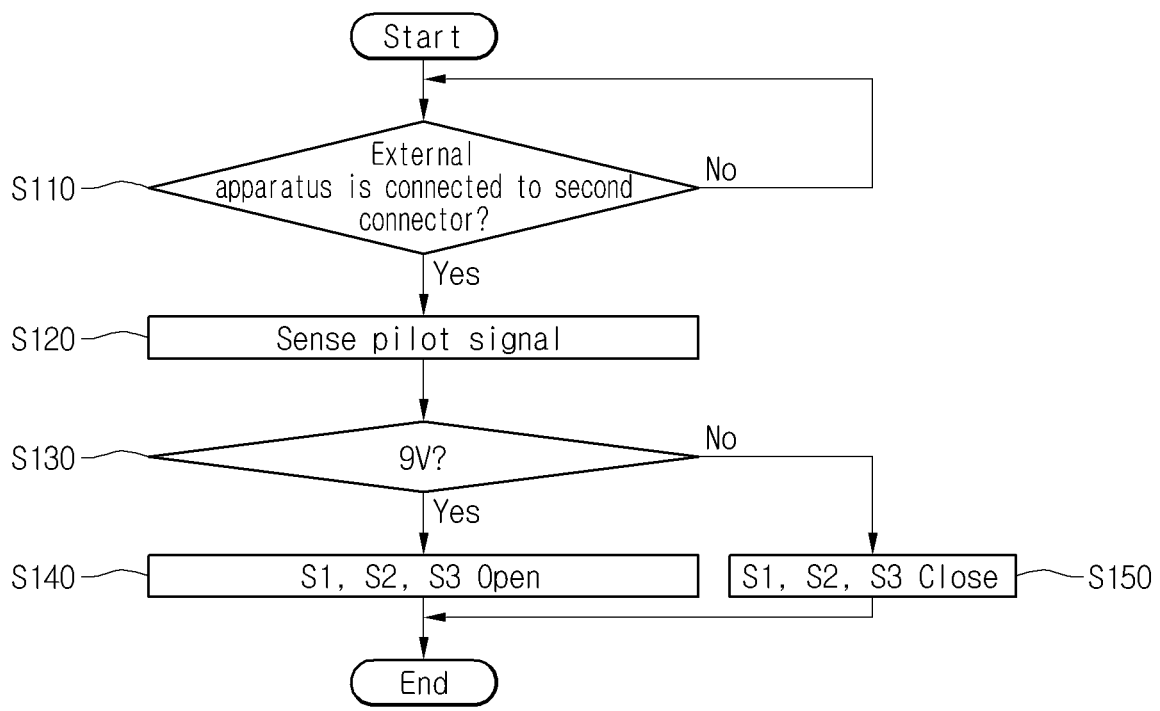
FIG. 7 is a flowchart illustrating a method of operating the portable charger according to an embodiment.

FIG. 7 is a flowchart illustrating a method of operating the portable charger according to an embodiment.

Referring to FIG. 7, in step S110, the portable charger 100 determines whether an external apparatus is connected to the second connector 130.

In step S120, when the external apparatus is connected to the second connector 130 as a determination result, the portable charger 100 senses a pilot signal which is transmitted/received through the pilot signal line.

Then, if the pilot signal is sensed, it is determined in step S130 whether the voltage of the pilot signal is maintained at 12V or dropped down to 9V.

As the determination result in step S130, if the voltage of the pilot signal is dropped down to 9V, it is determined that a charging request is generated from the electric vehicle, so that the first to third switches are turned off in the step S140.

Meanwhile, as the determination result in step S130, if the voltage of the pilot signal is maintained at 12V, the first to third switches are turned on in step S150.

Then, the portable charger transmits internal data to the external apparatus according to an instruction input from the external apparatus connected thereto or receives data transmitted from the external apparatus.

According to the embodiment, since any communication ports for the firmware update function, the charging history inquiry function and the charger diagnosis function do not exist at an appearance of the portable charger, an additional cost for fabricating a communication port is not necessary, so that a seal structure of the portable charger can be implemented at a lower cost.

According to the embodiment, since a port for implementing a communication function is not observed from the outer appearance of the portable charger, a malicious access due to a misuse by an arbitrary user can be prevented.

In addition, the communication function can be implemented by using the portable charger in itself, so that the communication function can be implemented at a lower cost as compared with the related art such as an RF scheme.

As described above, although various examples have been illustrated and described, the present disclosure is not limited to the above-mentioned examples and various modifications can be made by those skilled in the art without departing from the scope of the appended claims. In addition, these modified examples should not be appreciated separately from technical spirits or prospects.

What is claimed is:
1. A portable charger comprising:
    a main body;
    a first connector connected to the main body and a commercial power source; and a second connector connected to the main body and an external apparatus, wherein the main body comprises:

a power line formed between the first and second connectors to allow a commercial electric power to flow through the power line;

a relay disposed on the power line to intermit the commercial electric power flowing through the power line;

a data communication unit connected to the power line to perform data communication with the external apparatus connected to the second connector through the power line; and a switch disposed between the power line and the data communication unit to intermit the connection between the data communication unit and the power line, wherein the power line comprises:

a first power line through which a positive first electric power flows; and a second power line through which a negative second electric power flows, the relay comprises:

a first relay intermitting only the first electric power which flows through the first power line; and a second relay intermitting only the second electric power which flows through the second power line, and the data communication unit comprises:

a first data communication unit performing data communication through the first power line; and a second data communication unit performing data communication through the second power line, wherein the switch comprises:

a first switch independently intermitting a connection between the first power line and the first data communication unit;

a second switch independently intermitting a connection between the second power line and the second data communication unit; and a third switch intermitting a driving electric power supplied to the second data communication unit.

2. The portable charger of claim 1, wherein the power line performs one of a charging function for supplying the commercial electric power and a communication function for supplying data according to switching states of the relay and the switch.

3. The portable charger of claim 1, further comprising:

a charger control unit for controlling switching operations of the relay and the switch, wherein the charger control unit controls the switching operations of the relay and the switch according to a variation of a pilot signal which is transceived between the external apparatus and the second connector.

4. The portable charger of claim 3, wherein the charger control unit allows the relay to be turned off and the switch to be turned on when a level of the pilot signal is maintained at a first level after the external apparatus is connected to the second connector, and the charger control unit allows the relay to be turned on and the switch to be turned off when the level of the pilot signal is dropped down to a second level lower than the first level after the external apparatus is connected to the second connector.

5. The portable charger of claim 3, wherein a plurality of selection buttons for selecting an operation function of the portable charger are formed on the main body, and the charger control unit controls the switching operations of the relay and the switch according to a button selection by a user.

6. The portable charger of claim 1, wherein the relay and the switch are turned on or off according to a switching signal input from the external apparatus connected to the second connector.

7. The portable charger of claim 1, wherein one of the first and second data communication units is a data reception unit for receiving data transmitted from the external apparatus connected to the second connector, and remaining one is a data transmission unit for transmitting internal data to the external apparatus.

8. The portable charger of claim 1, wherein each of the first and second data communication units comprises a photo coupler including a light emitting diode emitting light and a light receiving transistor receiving the light generated from the light emitting diode.

9. The portable charger of claim 1, wherein the data include at least one of a firmware, charging history information and charger diagnosis information of the portable charger.

* * * * *